United States Patent Office 3,712,919
Patented Jan. 23, 1973

3,712,919
AROMATIC SULFONATES AND PROCESS FOR MAKING SAME
Charles V. Juelke, Morristown, N.Y., assignor to Celanese Corporation, New York, N.Y.
No Drawing. Filed Apr. 14, 1970, Ser. No. 28,542
Int. Cl. C07c 143/42
U.S. Cl. 260—512 R
7 Claims

ABSTRACT OF THE DISCLOSURE

Aromatic sulfonates, process for producing same based upon the reaction of an organic compound containing at least one epoxy group with an aromatic sulfonate containing at least one aromatic hydroxy group, and film- and fiber-forming polyesters containing these sulfonates and having an affinity for basic dyes. Among the novel sulfonates produced are the metallized salts of an anion having the following general formulae:

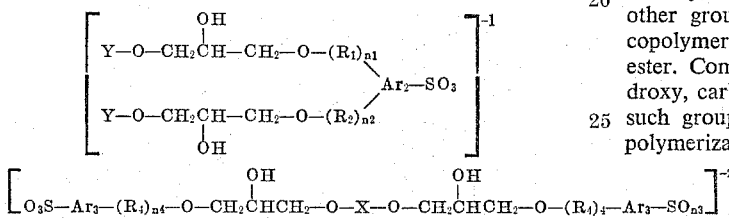

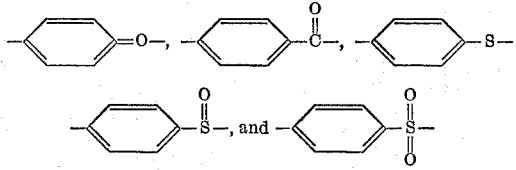

wherein $Ar_2$ is a trivalent aromatic radical which may be substituted or unsubstituted; $Ar_3$ is a divalent aromatic radical which may be substituted or unsubstituted; $n_1$, $n_2$, and $n_4$ independently are integers which are either 0 or 1; $R_1$, $R_2$ and $R_4$ are divalent radicals independently selected from the group consisting of alkarylene, arylene, X is a divalent radical selected from the group consisting of alkylene, cycloalkylene, aralkylene, alkarylene, arylene, or any combination thereof either with or without connecting groups such as oxy, thio, carbonyl, sulfinyl, and sulfonyl; and Y is a monovalent radical selected from the group consisting of alkyl, cycloalkyl, aralkyl, alkaryl, and aryl.

---

This invention relates to novel aromatic sulfonates, process for producing same, compositions of said aromatic sulfonates with film- and fiber-forming, linear synthetic polyesters, and shaped articles produced therefrom. More particularly, the invention is directed to novel aromatic sulfonates which are capable of being incorporated into fiber-forming, linear synthetic polyesters which in turn can be shaped into articles such as films, fibers, and the like, having an affinity for basic dyes.

Successful methods have been suggested in the past to improve the dyeability of shaped articles, such as films, fibers, and fabrics made from linear synthetic polyesters wherein basic dyes are utilized to provide brighter colors and to permit cross dyeing of the shaped articles. These methods utilize the technique of incorporating sulfonated compounds into linear synthetic polyesters to provide basic dyeable compositions. A typical procedure for the preparation of modified synthetic polyester is represented by U.S. Pat. 3,018,272, which describes the process of producing basic dyeable polyesters having sulfonated monomers incorporated therein as copolymers. In selecting such monomers or basic dye sensitizing units, it is necessary to consider a wide variety of related properties, including those which develop during the course of polymerization or use. Additive properties would include melting or decomposition point, boiling point, solubility in the polymer, reactivity toward copolymerization, effectiveness as a chain terminator, thermal stability, color, and the like. In addition to retention of normal properties of the polymer and shaped articles made therefrom, examples of properties which develop during the course of polymerization or use would include polymer color, availability of dye sites, high polymer molecular weight, dyeability with basic dyes, hue or dyed article, uniformity of dye uptake, and heat-, light-, and wash-fastness of the dyed article.

Typical of such sulfonated compounds which may be incorporated into polyesters to provide basic dyeable compositions are aromatic sulfonates wherein the sulfonate group is attached directly to an aromatic moiety. Additionally, said aromatic sulfonates must have at least one other group present in the molecule which will permit copolymerization of the aromatic sulfonate into the polyester. Commonly, these copolymerizable groups are hydroxy, carboxy, or alkoxycarbonyl. Although at least one such group is required, it is preferred to have two copolymerizable groups present in the sulfonate molecule.

While one copolymerizable group will permit incorporation of the aromatic sulfonate into the polyester, such monofunctional aromatic sulfonates are chain-terminating and tend to restrict the resultant polyester compositions to relatively low molecular weights. The presence of more than two copolymerizable groups in the sulfonate molecule is equally undesirable, since such polyfunctional aromatic sulfonates tend to result in cross-linking which gives to the resultant polyester compositions a three-dimensional structure which renders spinning and drawing of such polyester compositions into fibers and filaments very difficult, if not impossible. Thus the presence in the aromatic sulfonate molecule of two copolymerizable groups is preferred, since such difunctional sulfonates are incorporated into the polyester compositions as copolymers without the deleterious effects of either chain-termination or cross-linking.

Aromatic sulfonates having a copolymerizable group or groups consisting of hydroxy only, which sulfonates include the novel class of aromatic sulfonates as disclosed herein theoretically may be prepared by methods other than that disclosed herein, depending in part upon the structures of the desired compounds. Without attempting to present an exhaustive summary, the following descriptions are representative of several types of reactions which theoretically may be employed to obtain the novel aromatic sulfonates of this invention.

(1) The reaction of either (a) a metallic aryloxide with an alkyl halide or (b) a metallic alkoxide with an aralkyl halide. In general, a metallosulfo moiety would be a part of the metallic aryloxide or aralkyl halide, while the metallic alkoxide and alkyl halide would be substituted in such a manner as to provide, after reaction, the compounds of the present invention.

(2) The reaction of an aromatic alcohol with an aliphatic carbonate, with the aromatic alcohol containing the metallosulfo moiety. The aliphatic carbonate would be substituted as described in (1) above for the metallic alkoxide and alkyl halide.

(3) The addition of an aromatic alcohol to an alkene. The alkene would be substituted in such a manner as to provide the compounds of the present invention. In general, the aromatic alcohol would contain the metallosulfo moiety.

It should be apparent that in each of the above types of reactions the reaction may be carried out without the metallosulfo (or sulfo) moiety being a part of any reactant. The metallosulfo moiety may be introduced after reaction by sulfonation, followed by neutralization. This procedure, however, would not be preferred because the conditions of sulfonation give rise to competing side reactions which are not desirable. Furthermore, sulfonation of aromatic rings yields a mixture of several isomers which either must be used as such or given extensive purification in order to isolate the desired pure compound.

The process of the present invention has several important advantages over the processes outlined above. First, the yields of hydroxy-containing aromatic sulfonate products are significantly improved, ranging usually from 70% to 95%. By comparison, process (1) above usually gives yields in the range of from 40% to 60%. Second, the process of the present invention avoids stringent reaction conditions, thereby reducing the likelihood that the reaction path will be other than that desired or expected. Third, the process of the present invention either avoids the generation of undesirable or uwanted by-products or results in the generation of by-products which may be easily and completely removed from the desired sulfonate product, said by-products being the result of the reaction proceeding as desired or expected. For example, process (1) above results in the formation of metallic halide salts which must be removed from the hydroxy-containing aromatic sulfonate products prior to incorporation of said sulfonate products into polyesters. Not only is considerable effort required to reduce the contamination by said halide salts to acceptable levels, thereby adding to the cost of producing said aromatic sulfonate products, but the requisite degree of purification of said aromatic sulfonate products also substantially reduces the yields of said aromatic sulfonate products. Thus, the second and third advantages operate simultaneously to give hydroxy-containing aromatic sulfonate products of higher purity.

It is therefore an object of the present invention to provide a novel class of aromatic sulfonates.

It is also an object of the present invention to provide a process for the preparation of said novel class of aromatic sulfonates.

Another object is to provide shaped articles produced from fiber-forming linear synthetic polyesters modified with a novel class of aromatic sulfonates, the shaped articles having an affinity for basic dyes.

Still another object of the present invention is to provide a process for the production of fiber-forming, linear synthetic polyesters modified with a novel class of aromatic sulfonates from which polyester shaped articles having an affinity for basic dyes can be prepared.

These and other objects will become apparent in the course of the specification and claims which follow.

The novel class of aromatic sulfonates of this invention is prepared by the base-catalyzed reaction of an organic compound containing at least one epoxy group with an aromatic sulfonate containing at least one aromatic hydroxy group. According to the process herein disclosed, said hydroxy-containing aromatic sulfonates may be represented by the following general formula:

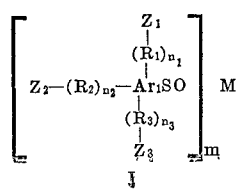

I wherein $R_1$, $R_2$ and $R_3$ are divalent radicals independently selected from the group consisting of alkarylene, arylene,

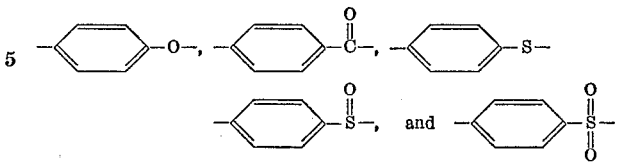

wherein the hydroxy group (if present) is attached to an aromatic nucleus; $n_1$, $n_2$, and $n_3$ are integers which independently are either 0 or 1; $Z_1$, $Z_2$, and $Z_3$ independently are either hydrogen or hydroxy; $Ar_1$ is a tetravalent aromatic radical containing from 6 to about 12 carbon atoms which may be substituted or unsubstituted; M is a metal capable of forming salts of aromatic sulfonic acids, generally a member of the alkali and alkaline earth metals having an atomic number of up to about 20. The preferred hydroxy-containing aromatic sulfonates may be described in terms of the above general formula, wherein at least one of $Z_1$, $Z_2$, and $Z_3$ is hydrogen; and at least one of $n_1$, $n_2$, and $n_3$ is 0. In a most preferred embodiment, $Z_2$ and $Z_3$ are hydrogen; $n_2$ and $n_3$ are 0; $Z_1$ is hydroxy; $Ar_1$ is selected from the group consisting of 1,4-phenylene, 2,7-naphthylene, and 1,5-naphthylene; $R_1$ is selected from the group consisting of

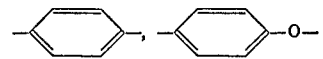

and

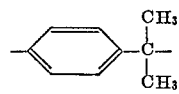

$n_1$ is either 0 or 1; and M is either sodium or lithium and most preferably lithium. By an organic compound containing at least one epoxy group is meant an organic compound having at least one epoxy group in each molecule, a melting point of less than about 200° C., and an average molecular weight of below about 3000. Preferably, the organic compound containing at least one epoxy group is a compound containing at least one glycidyl radical, selected from the group consisting of compounds represented by the following general formulae:

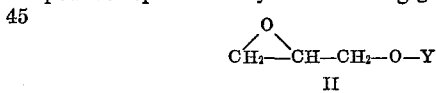

II

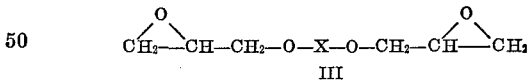

III wherein Y is a monovalent radical selected from the group consisting of hydrogen, alkyl, cycloalkyl, aralkyl, alkaryl, and aryl; and X is a divalent radical selected from the group consisting of alkylene, cycloalkylene, aralkylene, alkarylene, arylene, or any combination thereof either with or without connecting groups such as oxy, thio, carbonyl, sulfinyl, and sulfonyl. Although it is preferred that the aliphatic and cycloaliphatic radicals be saturated, said radicals may be unsaturated. In a most preferred embodiment, compounds represented by Formula II are reacted with aromatic sulfonates containing two hydroxy groups, said sulfonates being represented by the preferred embodiment of Formula I. Consequently, the resultant aromatic sulfonate products are metallized salts of an anion having the following general formula:

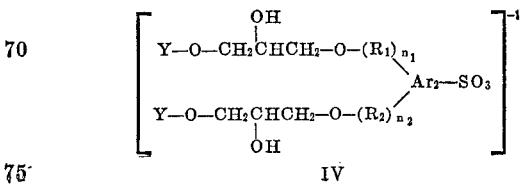

IV wherein Ar₂ is a trivalent aromatic radical which may be substituted or unsubstituted, and R₁, R₂, n₁, n₂, and Y are as defined hereinbefore. Additionally, compounds represented by Formula III are reacted with aromatic sulfonates containing one hydroxy group, said sulfonates being represented by the most preferred embodiment of Formula I. Hence, the resultant aromatic sulfonate products are metallized salts of an anion having the following general formula:

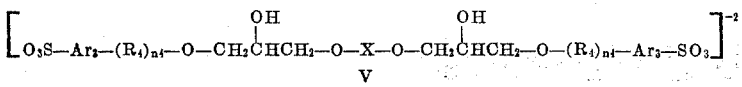
V where Ar₃ is a divalent aromatic radical which may be substituted or unsubstituted; R₄ is as defined for R₁, R₂, and R₃ hereinbefore; $n_4$ is an integer which is either 0 or 1; and X is as defined hereinbefore. The most preferred embodiment of the present invention may be described in terms of the general formulae IV and V given hereinbefore, wherein Ar₂ is selected from the group consisting of

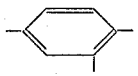

$n_1$ and $n_2$ each are 0; Y is selected from the group consisting of ethyl and phenyl; Ar₃ is selected from the group consisting of

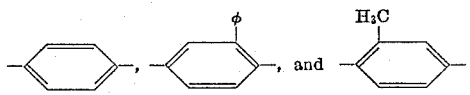

$n_4$ is 0; and X is selected from the group consisting of —(CH₂)₂—, —(CH₂)₄—

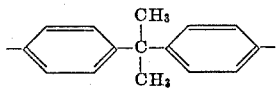

and

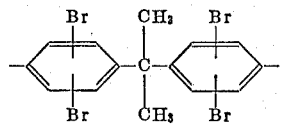

The metal cation preferably is either lithium or sodium, and most preferably lithium. The lithium salts are preferred in that linear synthetic polyesters modified with the lithium salts of the aromatic sulfonates of this invention dye to the darkest shade and hence a significantly lower amount of lithium salt monomer may be used to achieve a pre-selected depth of dye uptake.

As indicated hereinbefore, it is within the scope of the present invention to utilize in the disclosed process compounds containing one or more epoxy groups, including glycidyl radicals. Examples of such compounds include, among others, ethylene oxide, propylene oxide, 1,2 - epoxyheptane, 2,3 - epoxyhetane, 3,4 - epoxyheptane, 2,3 - epoxy - 5 - methylhexane, 9,10 - epoxy-1-octadecanol, 1,2 - epoxy - 4 - methyl - 4 - heptanol, glycidol, 2,3-epoxypropyl ethyl ether, 2,3 - epoxypropyl phenyl ether, epoxyethyl ethyl ether, epoxyethyl phenyl ether, 1,2-epoxy-cycloheptane, 1,2-epoxy-4-methylcyclohexane, 1,2-epoxycyclopentane, styrene oxide, 1:2,3:4-diepoxybutane, 1:2,3:4 - diepoxy-2-methylbutane, 1:2,3:4-diepoxy-2,3-dimethylbutane, 1:2,4:5-diepoxypentane, 1:2,5:6-diepoxyhexane, 2:3,4:5-diepoxyhexane, 1:2,6:7-diepoxyheptane, 1:2,7:8 - diepoxyoctane, 1:2,8:9 - diepoxynonane, 1:2,9:10 - diepoxydecane, 1:2,3:4 - diepoxy - 1,4-diphenylbutane, 1:2,3:4 - diepoxycyclohexane, 1:2,3:4-diepoxycyclooctane, 1:2,5:6 - diepoxycyclooctane, divinylbenzene diepoxide,

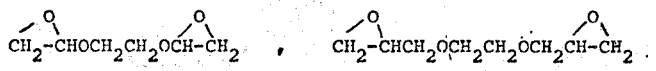

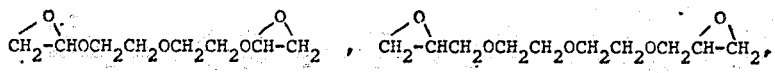

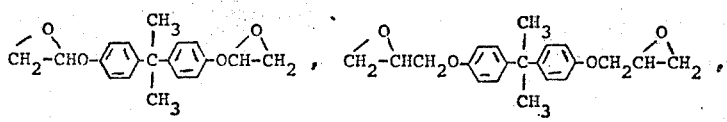

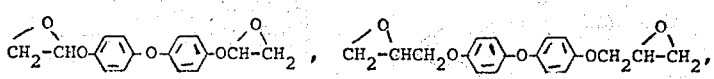

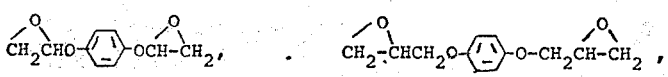

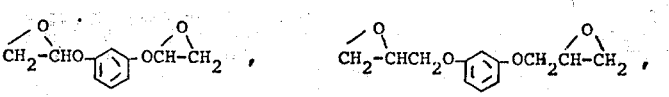

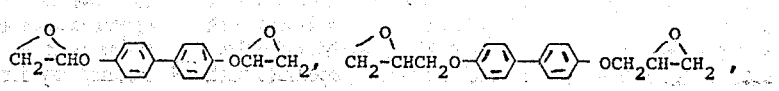

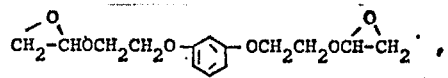

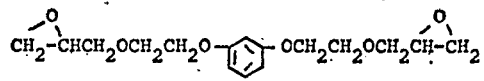

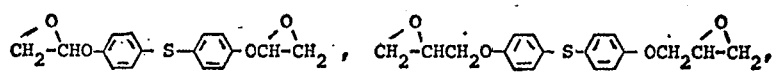

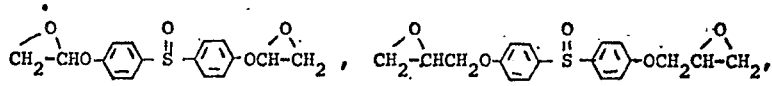

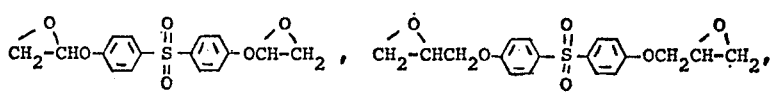

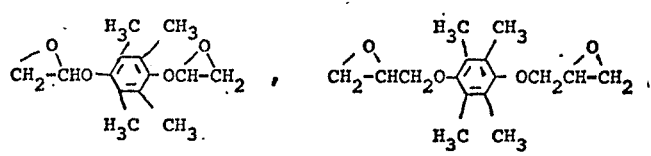

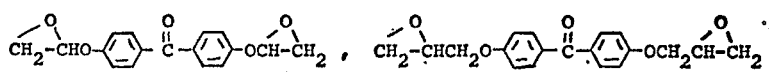

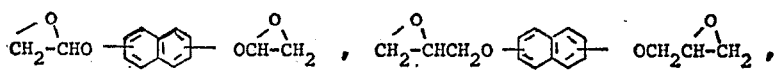

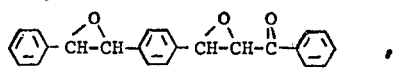

(Bakelite Epoxy Resin ERL 4221, manufactured by Union Carbide Corporation, New York, N.Y.)

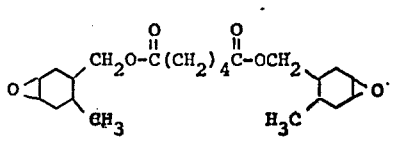

(Bakelite Epoxy Resin ERL 4289, manufactured by Union Carbide Corporation, New York, N.Y.)

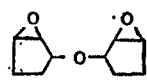

(Bakelite Epoxy Resin ERL 4205, manufactured by Union Carbide Corporation, New York, N.Y.)

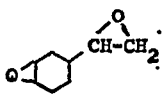

(Bakelite Epoxy Resin ERL 4206, manufactured by Union Carbide Corporation, New York, N.Y.)

1:2,5:6,9:10 - triepoxycyclododecane, polyepoxides such as those described in U.S. 2,902,398, epoxy resins such as those described in U.S. 3,014,007, glycidyl polyethers such as those described in U.S. 2,687,397, epoxides such as those described in Belgian 702,600, polyether polyepoxides such as those described in U.S. 2,829,071, epoxy resins such as those described in Chapter 1 of "Epoxy Resins," by Henry Lee and Kris Neville (McGraw-Hill Book Company, New York, 1957), and the like. Examples of preferred compounds containing at least one epoxy group include glycidol, 2,3 - epoxypropyl ethyl ether, 2,3-epoxypropyl phenyl ether,

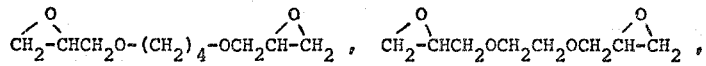

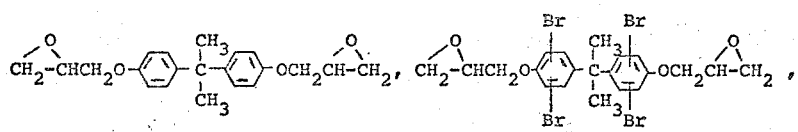

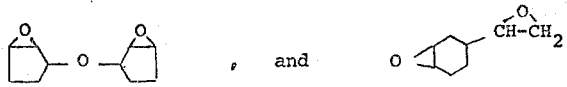

It is also within the scope of the present invention to utilize in the disclosed process aromatic sulfonates containing one or more hydroxy groups, as long as at least one hydroxy group is attached to an aromatic moiety. Examples of such compounds include, among others, metallized salts of p-phenolsulfonic acid, o-phenolsulfonic acid, 2-phenyl-1-phenol-4-sulfonic acid, 3-methyl-1-phenol-4-sulfonic acid, 1-naphthol-5-sulfonic acid, 2-naphthol-7-sulfonic acid, 2-naphthol-3,6-disulfonic acid, 2-naphthol-6,8 - disulfonic acid, 4-hydroxy-4'-biphenylsulfonic acid, 4-(4-hydroxyphenoxy)benzenesulfonic acid, 4-resorcinolsulfonic acid, 2,3 - dihyroxynaphthalene-6-sulfonic acid, 4,5 - dihydroxy - 2,7-naphthalenedisulfonic acid, 3-(2-hydroxyethoxy) - 1 - phenol-4-sulfonic acid, 4-(2-hydroxyethyl)-1-phenol-2-sulfonic acid, 2,4,6-trihydroxybenzenesulfonic acid, 2,3,5,6 - tetrahydroxybenzenesulfonic acid, and the like.

The most preferred compounds of this invention are:

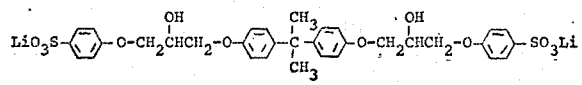

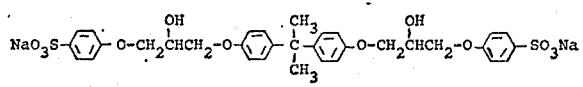

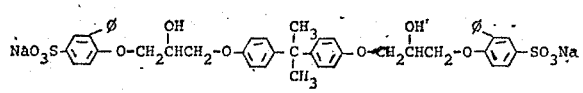

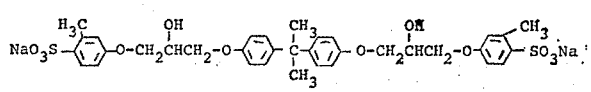

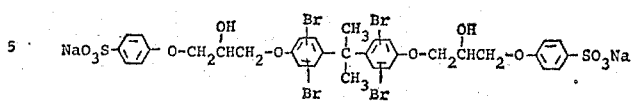

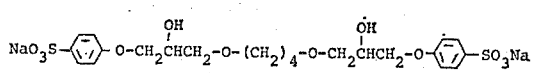

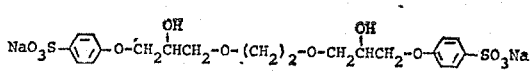

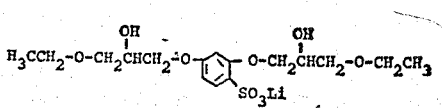

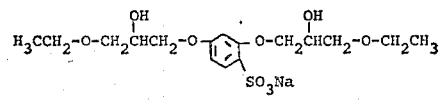

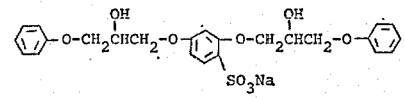

The process of the present invention is based upon the reaction of an organic compound containing at least one epoxy group with a hydroxy-containing aromatic sulfonate in the presence of a base and in a suitable solvent. If said epoxy group is in the form of a glycidyl radical, then the preferred aromatic sulfonates of the present invention are obtained. Without wishing to be bound by theory, the reaction apparently may be represented by the following sequence of reactions illustrating the reaction of glycidol with lithium p-phenolsulfonate in the presence of lithium hydroxide:

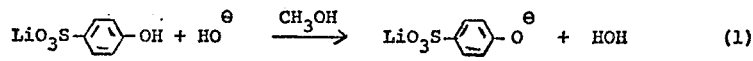  (1)

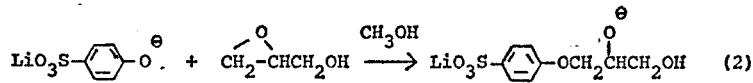  (2)

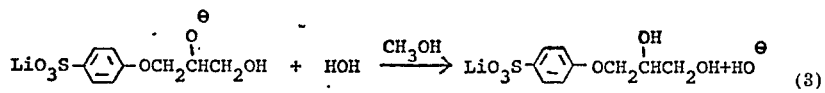  (3)

The base, in this case hydroxide ion, converts the aromatic hydroxy group to the corresponding anion (Equation 1) which in turn undergoes a nucleophilic substitution or displacement reaction with the epoxide group of the glycidyl radical (Equation 2); the resultant anion picks up a proton from the solvent system, thereby regenerating the base (Equation 3). In general, the selection of a solvent or solvent system for any given reaction depends upon the solubility characteristics of the reactants. Preferably, one or more solvents selected from the group consisting of water and lower aliphatic alcohols will be used. By "lower aliphatic alcohols" is meant aliphatic alcohols having from 1 to about 6 carbon atoms. Although an equivalent amount of water is both generated and consumed in the reaction, it is advantageous to run the reaction in a solvent or solvent system containing at least some additional water which may be present either as an impurity or in substantial amounts. In fact, it often is advantageous to utilize a wholly aqueous medium.

The base employed as a catalyst may be present in amounts up to about 25 mole percent, based upon the amount of hydroxy - containing aromatic sulfonate. Amounts of base greater than about 25 mole percent serve no useful purpose and often give products which are tacky and difficult to filter, even if the base is neutralized prior to isolating the product. In general, the base may be any inorganic or organic base having a $pK_b$ less than about 7.5. By "$pK_b$" is meant the negative logarithm of the dissociation constant of the base. Typical of such bases are the hydroxides of alkali and alkaline earth metals, such as sodium hydroxide, lithium hydroxide, and barium hydroxide; alkali metal alcoholates of the lower aliphatic alcohols, such as sodium methoxide, potassium ethoxide, sodium n-propoxide, potassium t-butyloxide, and the like; quaternary ammonium hydroxides, such as tetramethylammonium hydroxide, 2-hydroxyethyltrimethylammonium hydroxide, trimethylphenylammonium hydroxide, and the like; other quaternary ammonium bases, such as 2-hydroxyethyltrimethylammonium methoxide, 2-hydroxyethyltrimethylammonium phenoxide, and the like; quaternary phosphonium hydroxides, such as tetrabutylphosphonium hydroxide, methyltrioctylphosphonium hydroxide, benzyltriphenylphosphonium hydroxide, triphenyl-2,3-dihydroxypropylphosphonium hydroxide, and the like; and tertiary amines, such as trimethylamine, triethylamine, triethanolamine, and the like.

Although the reaction theoretically requires equivalent amounts of hydroxy groups and epoxy groups, product yield and purity in some instances are improved by having one of the reactants present in an excess of up to about 10 percent, with an excess of about 5 percent being preferred. Although either reactant may be used in excess, it is preferred to have an excess of the epoxy-containing compound since the unreacted (but frequently hydrolyzed) material is more easily separated from the reaction product than the unreacted hydroxy-containing aromatic sulfonate. Since the rate of reaction in general is directly proportional to the reaction temperature, temperatures higher than ambient temperature are preferred. Frequently, the reaction is carried out at the reflux temperature of the solvent or solvent system. At the completion of the reaction, it may be desirable in some instances to neutralize the basic catalyst with some suitable acid, such as p-phenolsulfonic acid. The reaction product is isolated by the usual techniques.

Although the emphasis has been on the use of pure compounds, the use of mixtures of aromatic sulfonates also is contemplated by the present invention. For example, it already has been pointed out that sulfonation of an aromatic nucleus yields a mixture of isomers (ortho, meta, and para), even though one isomer (para) usually predominates. Depending upon the particular compounds involved, it may be necessary or desirable to use such a mixture without purification. Furthermore, it may on occasion be either necessary or desirable to use a mixture of previously purified compounds. Such a mixture could be either a mixture of different metal salts of the same compound or a mixture of two structurally different compounds, the cation (metal portion) of which may be the same or different. Finally, some epoxy-containing materials or hydroxy-containing aromatic sulfonates may not be available as single, pure compounds. The use of such materials of necessity would produce a mixture of products, which mixture may not readily lend itself to purification. Thus, while the use of single, pure aromatic sulfonate products usually is preferred, the use of such mixtures as outlined above may be either necessary or desirable to achieve a proper balance of such properties as depth of dye uptake and lightfastness of the dyed article.

Incorporation of the aromatic sulfonates of the present invention into linear synthetic polyesters provide sites for basic dyes. It usually is desirable to use at least about 0.5 weight percent of aromatic sulfonate based on the weight of polymer. Incorporation of less than 0.5 weight percent usually results in polymers having only a relatively low affinity for basic dyes. Polymers containing about 10 weight percent of aromatic sulfonate have a very high affinity for basic dyes. Higher concentrations will not lead to appreciable increases in basic dyeability and in general may unduly affect tenacity in the shaped articles. Concentration of aromatic sulfonates in the range of 1 to 5 weight percent are preferred.

The term "linear synthetic polyester" as used herein includes as a preferred class polyester prepared from terephthalic acid or its dialkyl ester and a polymethylene glycol having the formula:

wherein $n_5$ is an integer from 2 to about 8. In this preferred class, the most preferred polyester, poly(ethylene terephthalate), is obtained when $n_5$ is 2. If desired, the polymethylene glycol may be replaced entirely or in part with other glycols, such as 1,4-cyclohexanedimethanol; 1,4-(bis(2-hydroxyethoxy)benzene, and the like; preferably, no more than about 10 percent of the polymethylene glycol will be replaced with another glycol. Additionally, other dicarboxylic acids or their esters, such as adipic acid, succinic acid, isophthalic acid, 1,1,3-trimethyl-5-carboxy-3(p-carboxyphenyl)-indane, and the like may be added in amounts up to about 10 weight percent to produce copolyesters.

Various other materials may be present in the reaction mixture. For example, such ester interchange catalysts as salts of calcium, magnesium, manganese, cobalt, zinc, and the like and such polymerization catalysts as antimony trioxide, antimonic acid, germanium dioxide, stannous oxalate, organotitanium compounds, and the like, usually will be present. Color inhibitors, such as alkyl or aryl phosphate esters, alkyl or aryl phosphite esters, and the like may be used. In addition, pigments, delustrants such as titanium dioxide, and other additives may be present.

The yarns or filaments in continuous or staple form produced in accordance with the present invention are suitable for the usual textile applications. They may be employed in the knitting or weaving of all types as well as in the production of non-woven, felt-like products produced by known methods. The physical properties of the modified yarns or filaments closely parallel those of their related non-modified polyester fibers. The modified yarns or filaments differ, however, in that they have a particular sensitivity toward basic dyes. By a "basic dye" is meant a colored cationic organic substance such as those containing sulfonium, oxonium, or quaternary ammonium functional groups. Among the basic types which may be applied either to the filaments in continuous or staple form obtained in accordance with the present invention or to fabrics prepared therefrom may be mentioned Victoria Green WB (C.I. Basic Green 4), a dye of the triphenylmethane type having the following chemical structure:

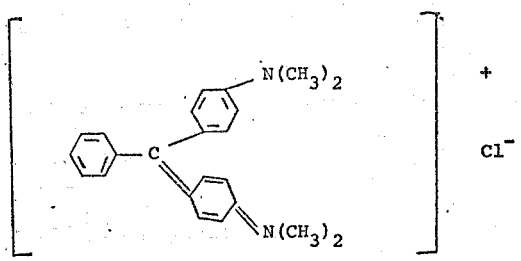

Victoria Pure Blue BO (C.I. Basic Blue 7), a triarylmethane type dye having the following chemical structure:

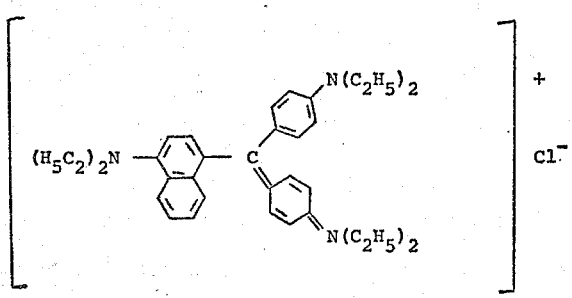

Sevron Blue 5G (C.I. Basic Blue 4), a dye of the oxazine type having the following chemical structure:

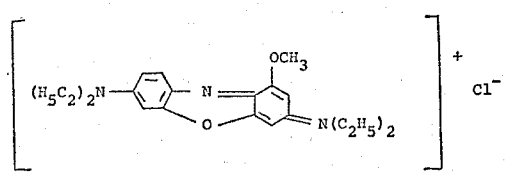

Brilliant Green B (C.I. Basic Green 1), a triphenylmethane type dye having the following chemical structure:

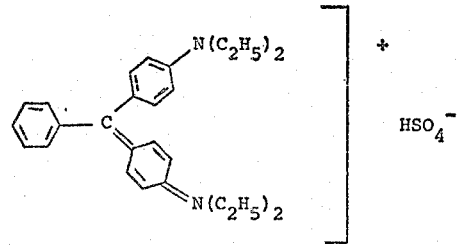

Rhodamine B (C.I. Basic Violet 10), a dye of the xanthene type having the following chemical structure:

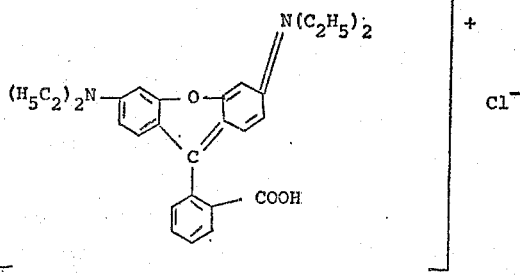

and the like. The dyes are preferably applied from an aqueous solution at a temperature between 80° C. and 125° C.

Filaments and films, i.e., shaped structures which have at least one dimension relatively very small and at least one dimension relatively large, are the preferred structures of the present invention. Such structures of the polyester compositions of this invention are permeated uniformly throughout by basic dyes applied from hot aqueous solution. The penetration of dyes is an important characteristic since poor resistance to fading and loss of color through rubbing or abrasion is a known characteristic of structures which retain dye only at their surface.

Without intending to limit it in any manner, the following examples will serve to illustrate the invention:

EXAMPLE 1

To a reactor containing a refluxing solution of 900 parts of lithium p-phenolsulfonate and 10.5 parts of lithium hydroxide monohydrate in 1000 parts of water is slowly added 425 parts of glycidol (90%). The resultant solution is refluxed for 1 hour and then neutralized to pH 7.0 with a 65% aqueous solution of p-phenolsulfonic acid. To the neutralized solution is added 15 parts of a 0.5% aqueous solution of Separan AP30 (a flocculating agent manufactured by Dow Chemical Company, Midland, Michigan). Water then is removed by distillation until solid begins to precipitate. The resultant mixture is cooled to 70° C. and 3900 parts of isopropanol added. After cooling slowly to 10° C., the precipitated product is collected by centrifugation, washed with 740 parts of isopropanol, and dried in vacuo at 100° C. The yield of 3-(4-lithiosulfophenoxy)-1,2-propanediol is 960 parts (82%). The product is 92% pure as determined by the analysis of adjacent hydroxy groups, corrected for glycerin content which is 1.0%. The adjacent hydroxy group analysis is 97%.

The analysis of adjacent hydroxy groups is carried out by oxidizing a sample of the product with excess paraperiodic acid in aqueous acetic acid. The excess of paraperiodic acid is determined by adding 20% aqueous potassium iodide solution to the reaction solution and titrating the iodine which is formed with 0.5 N standardized sodium thiosulfate solution to a starch indicator endpoint. A blank is run on another aliquot of para-periodic acid solution to determine the amount of oxidizing agent initially available. The difference between the blank run and the sample run permits calculation of the amount of oxidizing agent consumed by adjacent hydroxy groups and, consequently, the percentage of adjacent hydroxy groups present in the sample. For convenience, the calculation of adjacent hydroxy groups is made on the basis of the desired product; i.e. in Example 1, 3-(4-lithiosulfophenoxy)-1,2-propanediol. That is, in making the calculation it is assumed that the desired product is the only source of adjacent hydroxy groups. Because of this assumption and the sensitivity of the para-periodic acid to glycerin, it is necessary to determine the glycerin content of the product and to subtract from the calculated adjacent hydroxy value the contribution due to glycerin. The sensitivity of para-periodic acid to glycerine results from the low molecular weight of glycerin relative to the desired product and the fact that the reaction of glycerin with para-periodic acid gives an equivalent amount of 2-hydroxyacetaldehyde which in turn consumes an equivalent of para-periodic acid.

The glycerin content of the product is determined by dissolving a sample in water and injecting an aliquot into a gas chromatograph fitted with a 20 inch x ⅛ inch stainless steel column packed with Poropak Q (polymer beads, manufactured by Waters Associates, Framingham, Mass.) which is maintained at 200° C. The amount of glycerin responsible for any given peak area is determined from a calibration curve obtained by chromatographing known concentrations of glycerin in water and plotting peak area versus concentration.

EXAMPLE 2

A reactor is charged with 500 parts of water, 394 parts of lithium p-phenolsulfonate, and 10.5 parts of lithium hydroxide monohydrate. The resultant solution is heated to reflux and 410 parts of glycidol (95%) slowly added. After refluxing for 1 hour, the reaction solution is concentrated by distillation of solvent. The concentrated solution is cooled to 65° C. and 392 parts of isopropanol added; solid precipitates. The resultant mixture is allowed to cool to room temperature and filtered. The product is dried in vacuo at 100° C. The yield of 3-(4-lithiosulfophenoxy)-1,2-propanediol is 950 parts (75%). The adjacent hydroxy group analysis is 100% and the product contains 1.0% glycerin. Correcting the adjacent hydroxy group analysis for the presence of glycerin results in a product purity of 94%.

EXAMPLE 3

To a reactor containing a refluxing solution of 900 parts of lithium p-phenolsulfonate and 67 parts of a 45% methanolic solution of choline (2-hydroxyethyltrimethylammonium hydroxide) in 1000 parts of water is slowly added 425 parts of glycidol (90%). The resultant solution is refluxed for 1 hour and then concentrated by distilling solvent (primarily water). To the concentrated solution is added 3920 parts of isopropanol with stirring; solid precipitates. The mixture is allowed to cool to room temperature and the product isolated by filtration. The product is dried in vacuo at 100° C. The yield of 3-(4-lithiosulfophenoxy)-1,2-propanediol is 900 parts (77%).

EXAMPLE 4

The procedure of Example 3 is repeated, except that the methanolic solution of choline is replaced with 27 parts of sodium methoxide. Similar results are obtained.

EXAMPLE 5

The procedure of Example 3 is repeated, except that thte methanolic solution of choline is replaced with 75 parts of triethanolamine. Similar results are obtained.

EXAMPLE 6

The procedure of Example 3 is repeated, except that the lithium p-phenolsulfonate is replaced with 980 parts of sodium p-phenolsulfonate and the methanolic solution of choline is replaced with 20 parts of sodium hydroxide. Similar results are obtained, except that the product is 3-(4-sodiosulfophenoxy)-1,2-propanediol.

EXAMPLE 7

A reactor is charged with 6000 parts of water, 1230 parts of sodium 1-naphthol-8-sulfonate, and 20 parts of sodium hydroxide. The resultant solution is heated to reflux and 370 parts of glycidol slowly added. The resultant solution is refluxed for 17 hours; water then is removed by distillation until a precipitate begins to form. The mixture is allowed to cool; the product is isolated by filtration and washed with acetone. The yield of 3-(8-sodio-sulfo-1-naphthoxy)-1,2-propanediol is 1460 parts (92%).

EXAMPLE 8

The procedure of Example 7 is repeated, except that the sodium 1-naphthol-8-sulfonate is replaced with 1740 parts of 2-naphthol-3,6-disulfonic acid disodium salt. The yield of 3-[3,6-bis(sodiosulfo)-2-naphthoxy]-1,2-propanediol is 1860 parts (89%).

EXAMPLE 9

A reactor is charged with 1000 parts of water, 1050 parts of 4-sodiosulfo-3-methylphenol, and 20 parts of sodium hydroxide. The resultant solution is heated to reflux and 370 parts of glycidol slowly added. Refluxing is continued for 20 hours, after which time water is distilled until the solution becomes viscous. The product is precipitated by blending the concentrated solution with acetone. The product is isolated by filtration. The yield of 3-(4-sodiosulfo-3-methylphenoxy)-1,2-propanediol is 796 parts (56%).

EXAMPLE 10

The procedure of Example 9 is repeated, except that the amount of water is increased to 1250 parts and the 4-sodiosulfo-3-methylphenol is replaced with 1350 parts of sodiosulfo-2-phenylphenol (a mixture of isomers resulting from the sulfonation of 2-phenylphenol). The yield of 3-(sodiosulfo-2-phenylphenoxy)-1,2-propanediol is 1270 parts (92%).

EXAMPLE 11

To a reactor containing a refluxing solution of 1160 parts of sodium p-phenolsulfonate and 20 parts of sodium hydroxide in 1000 parts of water is slowly added 850 parts of 2,2-bis-[4-(2,3-epoxy-1-propoxy)phenyl]propane (Epi-Rez 508, manufactured by Celanese Coatings Company, Louisville, Ky.). The resultant solution is refluxed for 5 hours, concentrated by distilling water, then mixed thoroughly after cooling with ethanol. The yield of 2,2-bis-{4-[3-(-sodiosulfophenoxy) - 2 - hydroxy - 1 - propoxy] phenyl}propane is 1420 parts (78%).

EXAMPLE 12

To a reactor containing a refluxing solution of 900 parts of lithium p-phenolsulfonate in 5550 parts of methanol is added 22 parts of lithium hydroxide monohydrate and 885 parts of 2,2-bis-[4-(2,3-epoxy-]-propoxy)phenyl] propane (Epi-Rez 508, manufactured by Celanese Coatings Company, Louisville, Ky.). The resultant solution is refluxed for 5 hours. The methanol is removed by distillation and the residue allowed to cool and dry overnight. The yield of 2,2 - bis - {4-[3-(4-lithiosulfophenoxy)-2-hydroxy-1-propoxy]phenyl}propane is 1600 parts (91%).

EXAMPLE 13

The procedure of Example 12 is repeated, except that the lithium p-phenolsulfonate is replaced with 1360 parts of 4 - sodiosulfo - 2 - phenylphenol, the lithium hydroxide monohydrate is replaced with 20 parts of sodium hydroxide, and the amount of methanol is increased to 8100 parts. Also, the solidified residue is powdered and thoroughly washed with isopropanol. The product is isolated by filtration. The yield of 2,2-bis-{4-[3-(4-sodiosulfo-2- phenylphenoxy) - 2-hydroxy-1-propoxy]phenyl}propane is 2100 parts (95%).

EXAMPLE 14

A reactor is charged with 7930 parts of methanol, 450 parts of lithium p-phenolsulfonate, and 10.4 parts of lithium hydroxide monohydrate. To the resultant solution is added slowly 1130 parts of 2,2-bis[4-(2,3-epoxy-1-propoxy)-dibromophenyl]propane. (Epi-Rez 5163, manufactured by Celanese Coatings Company, Louisville, Ky.). The resultant solution is heated to reflux and refluxed for 18 hours. The reaction solution is then concentrated by distilling methanol and the concentrated solution is evaporated to dryness. The residue is washed thoroughly with isopropanol. The product is isolated by filtration and dried. The yield of 2,2-bis-{4-[3-(4-lithiosulfophenoxy)-2-hydroxy-1-propoxy]dibromophenyl}propane is 1160 parts (50%).

EXAMPLE 15

The procedure of Example 12 is repeated, except that the amount of methanol is increased to 7930 parts, the 2,2-bis-[4-(2,3-epoxy - 1 - propoxy)phenyl]propane is replaced with 700 parts of 1,4-bis-(2,3-epoxy-1-propoxy)butane (Epi-Rez 5022, manufactured by Celanese Coatings Company, Louisville, Ky.), the reaction solution is refluxed for 18 hours, and the residue is washed with isopropanol, filtered and dried. The yield of 1,4-bis-[3-(4-lithiosulfophenoxy)-2-hydroxy-1-propoxy)butane is 1260 parts (45%).

EXAMPLE 16

The procedure of Example 12 is repeated, except that the lithium p-phenolsulfonate is replaced with 980 parts of lithium 4-resorcinolsulfonate. The product from the reaction, presumably a mixture of the isomeric monoadducts with some diadduct, is obtained in good yield.

EXAMPLE 17

The procedure of Example 12 is repeated, except that the lithium p-phenolsulfonate is replaced with 1230 parts of lithium 2,3-dihydroxynaphthalenesulfonate. The products from the reaction, presumably a mixture of the isomeric monoadducts wtih some diadduct, is obtained in good yield.

EXAMPLE 18

The procedure of Example 12 is repeated, except that the lithium p-phenolsulfonate is replaced with 1220 parts of lithium 3-(2-hydroxyethoxy)-1-phenol - 4 - sulfonate. The product from the reaction, 3-[4-lithiosulfo-3-(2-hydroxyethoxy)-1-phenoxy]-1,2-propanediol, is obtained in good yield.

EXAMPLE 19

The procedure of Example 14 is repeated, except that the amount of methanol is reduced to 3000 parts, the 2,2-bis-[4-(2,3-epoxy - 1 - propoxy)dibromophenyl]propane is replaced with 145 parts of propylene oxide dissolved in 300 parts of methanol at about 0° C., and the reaction mixture is refluxed for 2 hours. The product, 3-(4-lithiosulfophenoxy)-2-hydroxypropane, is obtained in good yield.

EXAMPLE 20

The procedure of Example 19 is repeated, except that the lithium p-phenolsulfonate is replaced with 490 parts of lithium 4-resorcinolsulfonate and the amount of propylene oxide is increased to 290 parts dissolved in 600 parts of methanol at about 0° C. The product, lithium 2,4-bis-(2-hydroxy-1-propoxy)benzenesulfonate, is obtained in good yield.

EXAMPLE 21

The procedure of Example 12 is repeated, except that the 2,2-bis-[4-(2,3-epoxy - 1 - propoxy)phenyl]propane is replaced with 215 parts of 1:2,3:4-diepoxybutane. The product, 1,4-bis-(4-lithiosulfophenoxy)-2,3-butanediol, is obtained in good yield.

EXAMPLE 22

The procedure of Example 12 is repeated, except that the 2,2-bis-[4-(2,3-epoxy - 1 - propoxy)phenyl]propane is replaced with 510 parts of 2,3-epoxypropyl ethyl ether. The product, 3-(4-lithiosulfophenoxy)-1-ethoxy - 2 - propanol, is obtained in good yield.

EXAMPLE 23

The procedure of Example 12 is repeated, except that the 2,2-bis-[4-(2,3-epoxy-1-propoxy)phenyl]propane is replaced with 750 parts of a 2,3-epoxypropyl phenyl ether. The product, 3-(4-lithiosulfophenoxy)-1-phenoxy-2-propanol, is obtained in good yield.

EXAMPLE 24

The procedure of Example 12 is repeated, except that the 2,2-bis[4-(2,3-epoxy-1-propoxy)phenyl]propane is replaced with 350 parts of 1:2,5:6-diepoxycyclooctane. The product, presumably a mixture of 1,5-bis-(4-lithiosulfophenoxy) - 2,6 - dihydroxycyclooctane, and 1,6-bis-(4-lithiosulfophenoxy)-2,5-dihydroxycyclooctane, is obtained in good yield.

EXAMPLE 25

The procedure of Example 12 is repeated, except that the 2,2-bis-[4-(2,3-epoxy-1-propoxy)phenyl]propane is replaced with 795 parts of 4,4'-bis(2,3-epoxy-1-propoxy)biphenyl. The product, 4,4'-bis-[3-(4-lithiosulfophenoxy)-2-hydroxy-1-propoxy]biphenyl, is obtained in good yield.

EXAMPLE 26

The procedure of Example 12 is repeated, except that the 2,2-bis[4-(2,3-epoxy-1-propoxy)phenyl]propane is replaced with 555 parts of 1,3-bis-(2,3-epoxy-1-propoxy)benzene. The product, 1,3-bis-[3-(4-lithiosulfophenoxy)-2-hydroxy-1-propoxy]benzene, is obtained in good yield.

EXAMPLE 27

The procedure of Example 12 is repeated, except that the 2,2-bis-[4-(2,3-epoxy-1-propoxy)phenyl]propane is replaced with 425 parts of bis-(2,3-epoxycyclopentyl) ether (Bakelite Epoxy Resin EPL 4205, Manufactured by Union Carbide Corporation, New York, N.Y.). The product, presumably comprised of bis-[2-hydroxy-3-(4-lithiosulfophenoxy)-cyclopentyl]ether and other isomers, is obtained in good yield.

EXAMPLE 28

The procedure of Example 12 is repeated, except that the 2,2-bis[4-(2,3-epoxy-1-propoxy)phenyl]propane is replaced with 350 parts of 4-(epoxyethyl)-1,2-epoxycyclohexane (Bakelite Epoxy Resin EPL 4206). The product, 4-[2-(4-lithiosulfophenoxy)-1-hydroxy-1-ethyl] - 1 - (or -2-) -(4-lithosulfophenovy)-2-(or -1-) hydroxycyclohexane, is obtained in good yield.

EXAMPLE 29

The procedure of Example 12 is repeated, except that the 2,2-bis-[4-(2,3-epoxy-1-propoxy) phenyl] propane is replaced with 350 parts of 1:2, 5:6, 9:10-triepoxycyclododecane. The product, a mixture of isomers of tris-4-lithiosulfophenoxy)trihydroxycyclododecane, is obtained in good yield.

EXAMPLE 30

Preparation of pre-polymer.—A five-gallon jacketed autoclave, heated by means of a Dowtherm vapor system (heat transfer medium manufactured by Dow Chemical Company, Midland, Mich.) and fitted with an agitator and condenser, is charged with 30.0 parts of dimethyl terephthalate, 21.6 parts of ethylene glycol, and 0.0105 part of magnesium carbonate. The mixture is heated to reflux at atmospheric pressure. The temperature of the mixture is about 187° C., when methanol begins to distill. Methanol distillation is complete after about 2.5 hours; batch temperature has increased to about 220° C. The mixture is extruded, cooled, ground, and packaged and referred to hereinafter as magnesium pre-polymer.

Preparation of polymer.—An electrically-heated reactor, fitted with agitator, condenser, thermocouple, and means for operating under reduced pressure, is charged with 200 parts of magnesium pre-polymer and 0.2 part of antimony trioxide. The reactor is purged with nitrogen and heat applied. When the reaction mixture is molten, a solution of 4.0 parts of the product from Example 1 and 4.6 parts of adipic acid in 10 parts of hot ethylene glycol is added to the reactor. The resultant mixture is polymerized at about 280° C. at a pressure of less than 1.0 mm. mercury. The resultant polymer is extruded and is white in color with satisfactory properties. The polymer is converted into 3.0 d.p.f. by 2 inch staple fiber having a tenacity of 3.3 g.p.d., 40% elongation at break, and an initial modulus of 3.3 g.p.d. The fiber dyes to a medium shade of red with Sevron Brilliant Red B, a basic dye and to a medium shade of blue with Sevron Blue 5G, also a basic dye.

EXAMPLE 31

Using a magnesium pre-polymer, the polymerization of Example 30 is repeated, except that the product of Example 1 is replaced with an equal amount of the product of Example 6. Similar results are obtained. Fiber obtained from the polymer dyes to a medium shade of blue with Sevron Blue 5G, a basic dye.

EXAMPLES 32-41

Using a magnesium pre-polymer, the polymerization of Example 30 is repeated, except that the product of Example 1 is separately replaced with an equal amount of each of the products of Examples 7, 8, 9, 10, 11, 12, 14, 15, 27 and 28. In each instance similar results are obtained. Fiber obtained from the polymer obtained in each instance dyes either to a medium shade of red with Sevron Brilliant Red B or to a medium shade of blue with Sevron Blue 5G, both basic dyes.

EXAMPLE 42

Using magnesium pre-polymer, the polymerization of Example 30 is repeated, except that the product of Example 1 is increased to 10 parts, the adipic acid is omitted and 0.7 part of titanium dioxide and 0.01 part of dimethyl phosphite (as a 50% solution in ethylene glycol) are added. Similar results are obtained. Fiber obtained from the polymer dyes to a medium shade of blue with Sevron Blue 5G, a basic dye.

EXAMPLES 43-51

Using magnesium pre-polymer, the polymerization of Example 42 is repeated, except that the product of Example 1 is separately replaced with an equal amount of the products of Examples 7, 8, 9, 10, 12, 14, 15, 27, and 28. In each instance similar results are obtained. Fiber obtained from the polymer obtained in each instance dyes to a medium shade of blue with Sevron Blue 5G.

All dyeing described herein use the following procedure: The scoured fiber is added to water (60:1 liquor ratio) containing 3 grams per liter of biphenyl and 10% (on the weight of fabric) of sodium sulfate decahydrate. The bath is heated at about 70° C. for about 10 minutes and 2% (on the weight of fabric) of dyestuff added. The bath is boiled for 90 minutes. The rinsed fiber then is scoured, rinsed, and dried.

EXAMPLE 52

As a first control, the polymerization of Example 30 is repeated, except that the product of Example 1 is omitted. Although the polymer obtained is similar to that obtained in Example 30, the polymer of the present example, when converted into fiber, does not dye with Sevron Blue 5G, a basic dye.

EXAMPLE 53

As a second control, the polymerization of Example 42 is repeated, except that the product of Example 1 is omitted. Although the polymer obtained is similar to that obtained in Example 30, the polymer of the present example, when converted into fiber, does not dye with Sevron Blue 5G, a basic dye.

EXAMPLE 54

The procedure of Example 12 is repeated, except that the lithium hydroxide monohydrate is replaced with 67 parts of a 45% methanolic solution of choline (2-hydroxyethyltrimethylammonium hydroxide) and the 2,2-bis[4-(2,3 - epoxy-1-propoxy)phenyl]propane is replaced with 425 parts of glycidol (90%). Before removing the solvent, the choline is neutralized to a pH of about 7 with terphthalic acid. A good yield of 3-(4-lithiosulfophenoxy)-1,2-propanediol is obtained. Using magnesium pre-polymer, the polymerization of Example 30 is repeated, except that the product of Example 1 is replaced with an equal amount of the above product. The polymer which is obtained has normal properties, except for diethylene glycol content which is reduced. Fiber obtained from the polymer dyes to a medium shade of blue with Sevron 5G, a basic dye.

The above example illustrates an unexpected advantage which is obtained by not removing the basic catalyst from the hydroxy-containing aromatic sulfonate comonomer. In many base-catalyzed reactions, the catalyst is present in such small quantities that its presence in the product presents no problems related to the use of the product. In the process of the present invention; however, the basic catalyst is present in significant amounts and the normal processing to obtain the comonomer product may leave substantially all of the catalyst present in said product. It is known in general that the presence of bases, especially strong bases and amines, in polyester products may have a deleterious effect upon polymer properties, especially color, tenacity of fibers and filaments, and polymer stability. It appears essential, then, to insure that basic catalyst residues in the comonomer products obtained by the process of this invention are kept at reasonably low levels. To do this may involve an additional purification step. Not only does the procedure of Example 54 permit certain basic catalysts to be left entirely in said comonomer product, but the presence of said catalysts, as carboxylate salts, contributes to improved polymer properties, e.g., reduced diethylene glycol content.

Polyester compositions comprising various hydroxy-containing aromatic sulfonate comonomers produced in accordance with the process of the present invention but not claimed herein, said sulfonates being incorporated into said polyester compositions to give copolymers, in generalized and specific forms are described and claimed in copending and commonly assigned application Ser. No. 833,729, filed by Gerald W. Davis and Robert W. Stackman.

Various equivalent modifications will be apparent to those skilled in the art from a reading of the foregoing disclosure. Such modifications are within the inventive concept and include, for example, the substitution of ortho- and meta-isomers for para-isomers in the various generic and sub-generic formulae contained hereinbefore.

What is claimed is:
1. A process for the preparation of an aromatic sulfonate comprising reacting a first sulfonated compound containing at least one hydroxy group of the formula:

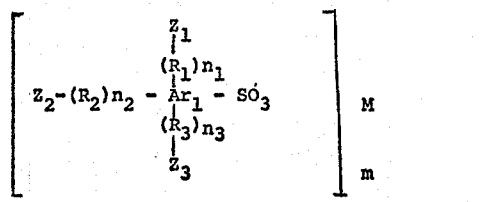

wherein $R_1$, $R_2$ and $R_3$ are divalent radicals independently selected from the group consisting of

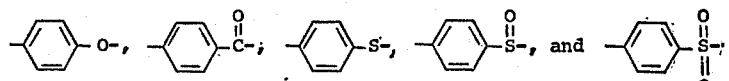

wherein the hydroxy group is attached to an aromatic nucleus; $n_1$, $n_2$ and $n_3$ are integers which independently are either 0 or 1; $z_1$, $z_2$ and $z_3$ are independently selected from the group consisting of hydrogen and hydroxy; $Ar_1$ is a tetravalent aromatic radical containing from 6 to about 12 carbon atoms which may be substituted or unsubstituted wherein the substituent is —$CH_3$; M represents any metal capable of forming salts of aromatic sulfonic acids; and $m$ is an integer equal to the valency of the metal M, with a second compound containing at least one epoxy group of the formula:

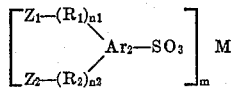

wherein Y is a monovalent radical selected from the group consisting of hydrogen, alkyl, cycloalkyl, aralkyl, alkaryl, and aryl; and X is a divalent radical selected from the group consisting of alkylene, cycloalkylene, aralkylene, alkarylene, arylene, and combinations thereof, in the presence of a catalytic amount of a base.

2. The process of claim 1 wherein said first compound contains from one to three hydroxy groups and said second compound contains one or two epoxy groups.

3. The process of claim 1 wherein said first compound is represented by the following formula:

wherein $R_1$ and $R_2$ are divalent radicals independently selected from the group consisting of alkarylene, arylene,

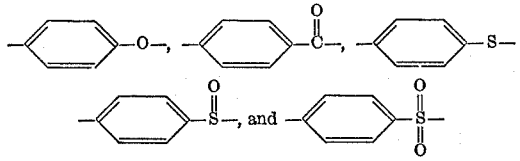

wherein the hydroxy group is attached to an aromatic nucleus; $n_1$ and $n_2$ are integers which independently are either 0 or 1; $Z_1$ and $Z_2$ are radicals independently selected from the group consisting of hydrogen and hydroxy; $Ar_2$ is a trivalent aromatic radical; M represents any metal capable of forming salts of aromatic sulfonic acids; and $m$ is an integer equal to the valency of the metal M, and said second compound is represented by the following formulae:

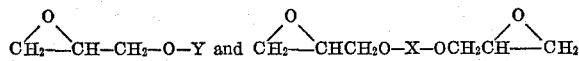

wherein Y is a monovalent radical selected from the group consisting of hydrogen, alkyl, cycloalkyl, aralkyl, alkaryl, and aryl; and X is a divalent radical selected from the group consisting of alkylene, cycloalkylene, aralkylene, alkarylene, arylene, and combinations thereof.

4. The process of claim 1 wherein said first compound is the lithium salt of p-phenolsulfonic acid and said second compound is glycidol.

5. An aromatic sulfonate comprising the reaction product of a first sulfonated compound containing at least one hydroxy group of the formula:

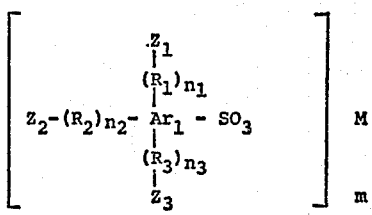

wherein $R_1$, $R_2$, and $R_3$ are divalent radicals independently selected from the group consisting of

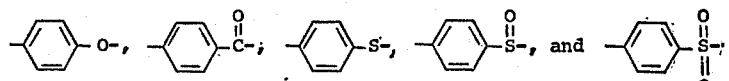

wherein the hydroxy group is attached to an aromatic nucleus; $n_1$ and $n_2$, and $n_3$ are integers which independently are either 0 or 1; $Z_1$, $Z_2$ and $Z_3$ are independently selected from the group consisting of hydrogen and hydroxy; $Ar_1$ is a tetravalent aromatic radical containing from 6 to about 12 carbon atoms which may be substituted or unsubstituted wherein the substituent is —$CH_3$; M represents any metal capable of forming salts of aromatic sulfonic acids; and $m$ is an integer equal to the valency of the metal M, with a second compound containing at least one epoxy group of the formula:

$$CH_2-CH-CH_2-O-y \text{ and}$$

$$CH_2-CH-CH_2-O-X-OCH_2-CH-CH_2$$

wherein Y is a monovalent radical selected from the group consisting of hydrogen, alkyl, cycloalkyl, aralkyl, alkaryl, and aryl; and X is a divalent radical selected from the group consisting of alkylene, cycloalkylene, aralkylene, alkarylene, arylene, and combinations thereof.

6. The product of claim 5 wherein said first compound contains from one to three hydroxy groups and said second compound contains one or two epoxy groups.

7. The product of claim 5 wherein said first compound is represented by the following formula:

wherein $R_1$ and $R_2$ are divalent radicals independently selected from the group consisting of alkarylene, arylene,

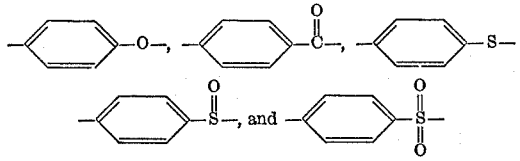

wherein the hydroxy group is attached to an aromatic nucleus; $n_1$ and $n_2$ are integers which independently are either 0 or 1; $Z_1$ and $Z_2$ are radicals independently selected from the group consisting of hydrogen and hydroxy; $Ar_2$ is a trivalent aromatic radical; M represents any metal capable of forming salts of aromatic sulfonic acids; and $m$ is an integer equal to the valency of the metal M, and said second compound is represented by the following formulae:

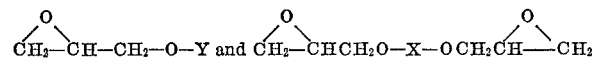

wherein Y is a monovalent radical selected from the group consisting of hydrogen, alkyl, cycloalkyl, aralkyl, alkaryl, and aryl; and X is a divalent radical selected from the group consisting of alkylene, cycloalkylene, aralkylene, alkarylene, arylene, and combinations thereof.

References Cited

UNITED STATES PATENTS 2,694,087  11/1954  Petrie et al. ........ 260—512
3,004,006  10/1961  King et al. ......... 200—512

DANIEL D. HORWITZ, Primary Examiner

U.S. Cl. X.R.

260—511, 79.3, 75; 8—166, 168